United States Patent
Chang

(10) Patent No.: US 10,361,775 B2
(45) Date of Patent: *Jul. 23, 2019

(54) RETRO-DIRECTIVE ANTENNA SYSTEMS FOR MULTI-CHANNEL COMMUNICATIONS

(71) Applicant: SPATIAL DIGITAL SYSTEMS, INC., Agoura Hills, CA (US)

(72) Inventor: Donald C. D. Chang, Thousand Oaks, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,701

(22) Filed: Mar. 13, 2017

(65) Prior Publication Data

US 2017/0187440 A1    Jun. 29, 2017

Related U.S. Application Data

(63) Continuation of application No. 13/778,171, filed on Feb. 27, 2013, now Pat. No. 9,596,024.

(51) Int. Cl.
| | | |
|---|---|---|
| *H04B 7/06* | (2006.01) | |
| *H04B 7/204* | (2006.01) | |
| *H04B 7/208* | (2006.01) | |
| *H04W 4/90* | (2018.01) | |
| *H04B 7/185* | (2006.01) | |
| *H04W 24/02* | (2009.01) | |
| *H04W 72/06* | (2009.01) | |

(52) U.S. Cl.
CPC ......... *H04B 7/2041* (2013.01); *H04B 7/0617* (2013.01); *H04B 7/18504* (2013.01); *H04B 7/208* (2013.01); *H04W 4/90* (2018.02); *H04W 24/02* (2013.01); *H04W 72/06* (2013.01); *H04B 7/0639* (2013.01)

(58) Field of Classification Search
CPC ........ H04B 7/2041; H04B 7/208; H04W 4/22
See application file for complete search history.

(56) References Cited

U.S. PATENT DOCUMENTS 5,512,906 A * 4/1996 Speciale ................ H01Q 13/18
  342/375
6,968,187 B1 * 11/2005 Irwin ................ H04B 7/18504
  342/352

(Continued)

*Primary Examiner* — Andrew Lai
*Assistant Examiner* — Chuong M Nguyen
(74) *Attorney, Agent, or Firm* — Phuong-Quan Hoang

(57) ABSTRACT

A retro-directive antenna system on a mobile airborne platform for communication with a ground hub located within a coverage area. The system comprises an antenna array, a receive beamforming network, and a diagnostic processor. The antenna array comprises a plurality of antenna elements. The receive beamforming network generates concurrently a plurality of receive beams for the respective antenna elements. The receive beams correspond to respective beam positions within the coverage area. A first beam position points to the ground hub and a corresponding receive beam receives a target signal from the ground hub. The diagnostic processor determines a best position for the first beam position based on a ranking system and controls the receive beamforming network by updating the beam positions based on the best position for the first beam position.

20 Claims, 8 Drawing Sheets

(56) References Cited

U.S. PATENT DOCUMENTS

| | | | | |
|---|---|---|---|---|
| 8,078,162 B2* | 12/2011 | Deaton | ............... | H04B 7/18506 |
| | | | | 455/404.1 |
| 8,743,004 B2* | 6/2014 | Haziza | ................. | H01Q 3/0233 |
| | | | | 343/772 |
| 2004/0053634 A1* | 3/2004 | Gainey | .................. | H01Q 1/125 |
| | | | | 455/522 |
| 2008/0291864 A1* | 11/2008 | Chang | ................... | H04B 7/2041 |
| | | | | 370/316 |
| 2010/0122143 A1* | 5/2010 | Lee | ..................... | H03M 13/1117 |
| | | | | 714/752 |
| 2012/0301136 A1* | 11/2012 | Chang | .................. | H04B 7/0413 |
| | | | | 398/16 |
| 2013/0070677 A1* | 3/2013 | Chang | ................. | G01S 13/9303 |
| | | | | 370/328 |

* cited by examiner

US 10,361,775 B2

RETRO-DIRECTIVE ANTENNA SYSTEMS FOR MULTI-CHANNEL COMMUNICATIONS

CROSS REFERENCE TO RELATED APPLICATIONS

This patent application is a continuation application of U.S. patent application Ser. No. 13/778,171, filed on Feb. 27, 2013, entitled "Multi-Channel Communication Optimization Methods and Systems". This application is related to U.S. patent application Ser. No. 13/623,882, filed on Sep. 21, 2012, entitled "Concurrent Airborne Communication Methods and Systems," now U.S. Pat. No. 8,767,615 issued on Jul. 1, 2014, which is expressly incorporated herein by reference in its entirety.

TECHNICAL FIELD

This disclosure describes exemplary embodiments on improving the operation and use of airborne communication methods and systems such as through ranking and related calibration.

BACKGROUND

During emergencies, disasters, wartime, equipment failure or other troubled situations, the regular communications structures such as wireless cell phone towers, satellite dish, Internet, etc., may become damaged or suffer a power outage in one region, but still operate normally in another region. Moreover, even in situations where there is no disaster, it is sometimes advantageous to utilize the still-working communications infrastructure in other areas, for example, such as to reduce operational overload or to avoid communication congestion in one major city, but not in other areas; or when there is equipment malfunction in one region, but not in another. Additionally, for military or missing person purposes, or in remote areas, where there are few existing stationary communication towers, it is beneficial to be able to use the functional infrastructure that exists in other areas. Therefore, it would be valuable to have methods and apparatuses to address these scenarios and how to optimally operate (e.g. such as through calibration of) the substituted methods and systems.

SUMMARY

Embodiments include a roving (e.g. aircraft) communication system that enables communications between a foreground region and a background region, wherein the roving electronic system is set up to link communications generated using wave front multiplexing techniques and the roving electronic system is set up to rank the received communications. The wave front multiplexing techniques is set up to multiplex a first set of signals received from the background region by the roving electronics system; and the wave front multiplexing techniques is further configured to multiplex a second set of signals received from the foreground region by the roving electronics system. Further embodiments are described below.

DRAWINGS

The drawings depict exemplary embodiments and are not intended to be limiting in scope and may not depict objects to scale.

DETAILED DESCRIPTION

This disclosure describes embodiments of optimizing the performance of roving communication towers that comprise manned or un-manned airborne or seaborne vehicles (collectively "UAV") carrying communication equipment to perform the role of wireless communication towers or cellular sites and WiFi or base stations that normally would have been operational in a local area ("foreground" area). In one embodiment, multiple UAVs act as roving communication nodes having equipment that operate concurrently with the communication devices (e.g. smartphones) in a foreground area and also with the still-operational communication and data networks in a background area (e.g. another city or state). To enable or to improve the operation of the communication system, antenna (beam or signal) positioning optimization, wavefront multiplexing ("WF MUX") techniques calibration and compensation techniques are added. These techniques also lead to a more secure form of communication because the signals are divided up among different channels and recovered using a key. Redundancy also enables signal recovery even when one channel is broken.

With respect to the foreground region, the UAVs communicate with the devices such as personal handsets and computers used by the victims or special communications equipment used by rescue workers in the foreground area. The UAVs have antenna arrays and electronics to simultaneously collect information and transmissions from many sources located in the foreground area, while rejecting noise and interference. The UAVs have onboard signal beam forming techniques to strengthen communication transmissions with signal receivers in the foreground area. Additionally, in the background region, the UAVs have onboard equipment to communicate with (link to) hubs and networks and ground based beam forming facilities ("GBBF") located in the background area. Data transmission to either the foreground or the background regions are implemented using retro-directive arrays and WF MUX to perform the data packing and transmission. Finally, these techniques of WF MUX, calibration, etc., are not limited to UAVs or rescue missions. Wherever or however WF MUX techniques are applied in telecommunication, in data transmission, in cloud computing, optical fiber transmission in the air, land or at sea and so on, these methods and systems may also be utilized.

Figure 1:
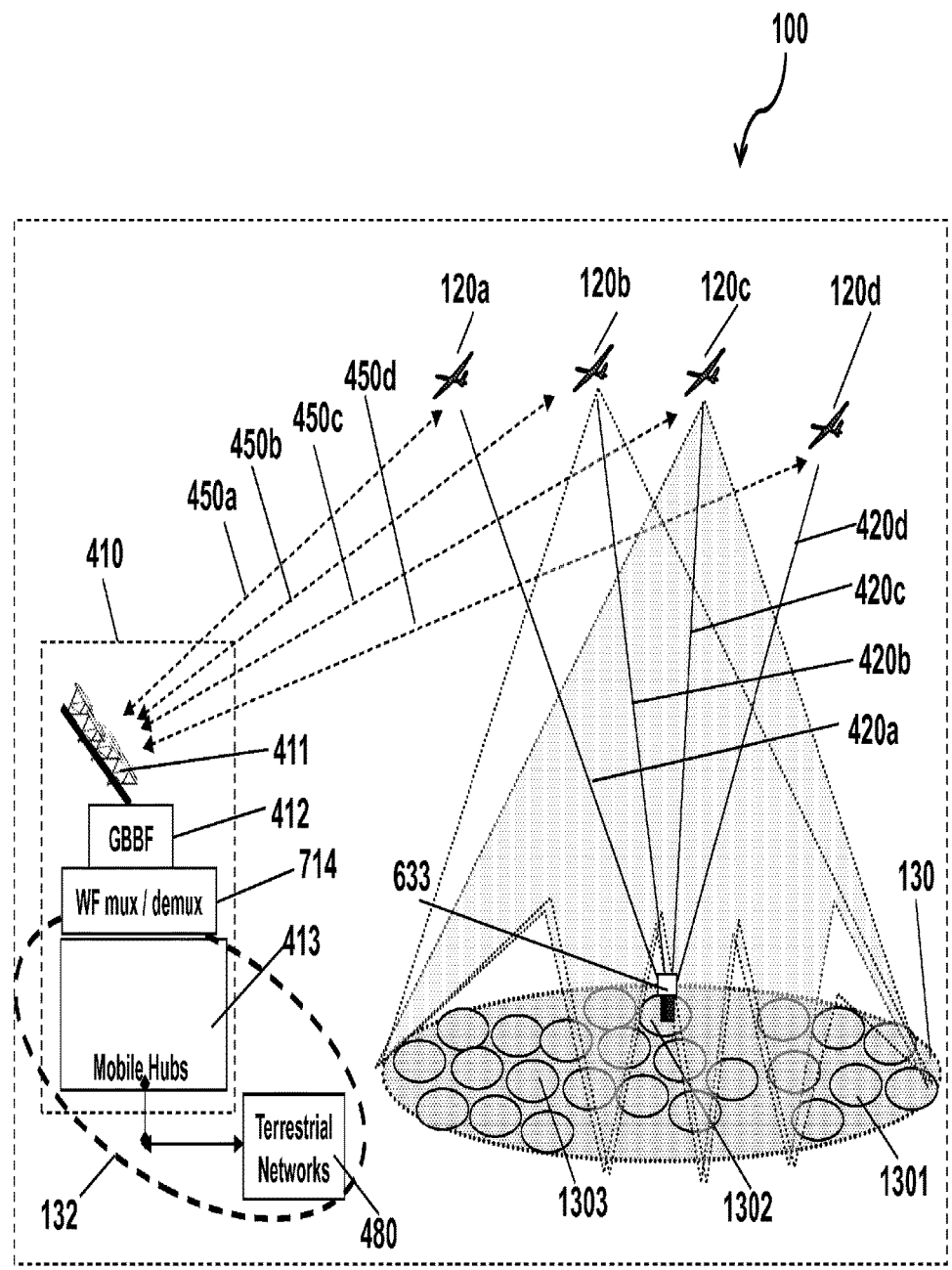
FIG. 1 depicts a communication architecture using airborne vehicles as communications towers or exchanges.

FIG. 1 depicts an exemplary embodiment of the physical configuration of a communication architecture 100 that covers two geographic regions, the foreground area or region 130 (also "user segment") and the background area or region 132 (also "ground segment"). Air or sea vehicles or UAVs 120a-d (collectively "120," also "airborne segment") are flying mostly (or docked near) over the foreground area 130; they are flying well below the altitude where they would enter an orbit of the Earth where they would constitute satellites. The UAVs 120 are cost effective, readily fly up and down from and around the Earth like an airplane and do not have to be launched into an orbit. Although there can be any number of them, four aircrafts are illustrated. The UAVs 120 range in shape and size from a sphere of an inch in diameter to a huge airplane of many yards in length and width. In FIG. 1, the UAVs 120 are usually less than five feet in length and width and weigh less than a hundred pounds even with the equipment they carry. Such smaller UAVs 120 are cost effective and consume less power, such as less than 200 Watts, which should allow them to remain in the air for at least twelve hours to provide continuous communication service in real time. In another embodiment, the UAVs 120 are decreased in size or have more features or consume less power.

The proximity of the borders of the foreground area 130 and the background area 132 is in the range of approximately 0 to 2000 kilometers (Km), depending on the signal strength, the altitude at which the UAVs 120 fly, or on environmental factors. The zero-kilometer refers to a scenario where the foreground 130 and background 132 are adjacent neighborhoods. The signal transmission strength is increased using WF MUX and beam forming techniques in various embodiments as described below.

In the embodiment of communication architecture 100 of FIG. 1, at least one of the four UAVs 120 has equipment 122 (e.g. FIG. 2) that performs signal exchanges with the foreground area 130 through the wireless foreground links 420a-d (collectively "420"). On-board equipment 122 also performs signal exchanges with the background area 132 through the wireless background links 450a-d (collectively "450"). The background area 132 comprises ground hub 410 that includes antennas 411. The antennas 411 are electrically coupled to a GBBF facility 412 that shapes and determines the characteristics of the signals that the UAVs 120 transmits to devices in the foreground area 130. The GBBF 412 comprises or is electrically connected to wave front multiplexing and demultiplexing electronics WFMux 714. The ground hub 410 depicted in FIG. 1 comprises additional processors or mobile hubs 413 that are sometimes electrically coupled to terrestrial networks 480 such as the Internet, land lines, and so on. In various embodiments, the ground hub 410 comprises a communications processing center in a building or a moving vehicle, which oversees many of the operations of the UAVs 120 by providing instructions or commands to the UAVs 120. Ground hub 410 comprises computers or processors to perform calibration, compensation, and control of the UAVs 120. The ground hub 410 also has a gateway to terrestrial networks 480 that permit people in the background area 132 to communicate with or to monitor the situation in the foreground area 130 through a telephone system, a local area network or Internet and computers. As a result, people such as rescue works in a foreground area 130 will have access to real time imaging, and communications among co-workers and dispatching centers connected by the ground hub 410.

Figure 2:
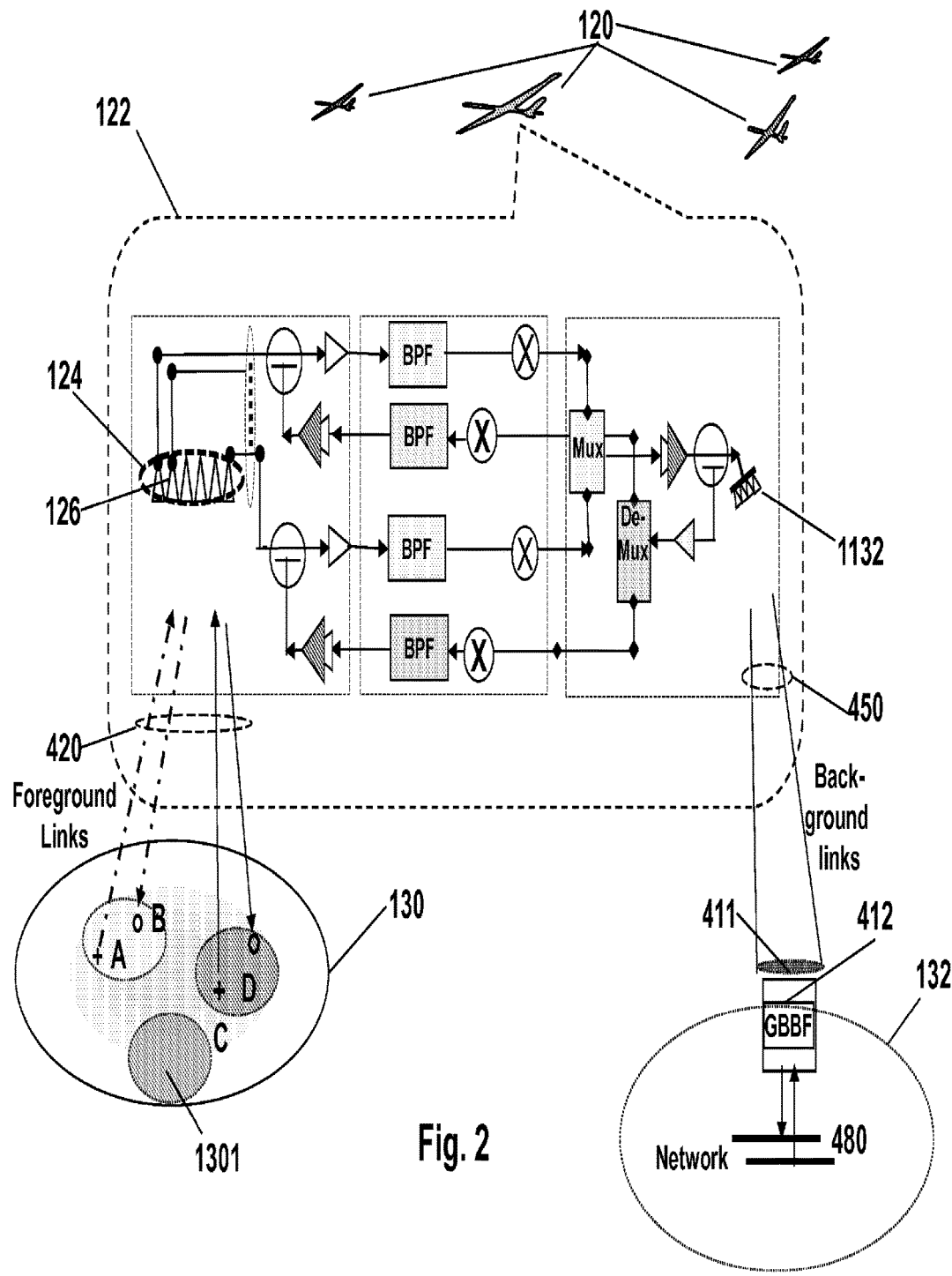
FIG. 2 depicts a block diagram of communications equipment onboard one aircraft.

FIG. 2 depicts one embodiment of the equipment 122 onboard one or more of the UAVs 120. For example, at least one of the UAVs 120 carries an antenna array 124, having antenna elements 126 that communicate with the foreground area 130. Equipment 122 also comprises antenna arrays 1132 that communicate with the background area 132. In a WF MUX implementation, more than one UAV 120 would carry such antennas.

In FIG. 2, the communication frequencies used by the UAVs 120 to the ground hub 410 are the same and are in the Ku and/or Ka and/or S band or some other band that is often backwards compatible with existing UAVs 120 or in the bands where the cost per unit bandwidth is more cost effective at the FCC-based spectrum auction. The wireless background links 450 carry signal transmissions all in the same frequency, e.g., Ku and/or Ka and/or S bands. The wireless foreground links 420 carry signal transmissions in a variety of frequencies because users in the foreground area 130 tend to have different types of mobile and communication devices. For example, the consumer and residents communicate via their mobile phones or personal wireless communications devices with WiFi, CDMA, GSM, 3G, 4G, and 5G; interconnected via DSL, cable modem, fiber optics and so on. In addition, the military or rescue workers in the foreground 130 may be carrying equipment that operates in an emergency band rather than the consumer frequency bands. Users in the foreground 130 are thus provided with temporary communications with their existing own personal mobile or re-locatable communications devices to the outside world through the equipment 122 onboard the UAVs 120.

The architectures described below include WF MUX technology that is optimized by (1) corrected antenna positioning and (2) calibration and compensations. WF MUX is also used for (3) security and redundancy purposes that makes signal transmissions more optimal. These three aspects can operate together or separately and the first two are described in turn. To keep the same communications capabilities but with reduced weights and power consumptions on communications payloads, there is no beam forming network on-board the air platforms for the foreground links. The beam forming functions are performed in remote processing facilities that may be a fixed ground facility, on a mobile ground platform, a mobile platform in the air or at sea. These facilities are collectively referred to as remote beam forming facilities. An array 124 on an airborne platform may be serviced and/or controlled by more than one remote beam forming facilities via multiple concurrent background links 450.

Regarding antenna positioning, the onboard antenna arrays 124 and 1132 in FIG. 2 are optimally positioned to point in a direction of the signal source or ground receiver to transmit and receive signals. In different embodiments, the array elements are not anchored in a planar fashion, and are instead pointed to various directions for performance enhancement or under the physical constraints of the air platforms. The array element arrangements are to enlarge an instantaneous field of view or coverage and ultimately to enable stronger signal reception and improve the signal to noise ratio (SNR). Because the users in the foreground area 130 have devices 633 such as hand-held phones or small equipment that tend to transmit relatively weak signals and because the devices 633 may be located anywhere in the foreground area 130 and may continue to move around, the technique for beam pointing (positioning the array 124) of multiple concurrent (narrow) beams with high gain servicing multiple users with low gain devices (disadvantage users) should be sophisticated enough to detect and sense/track moving weaker signals. By contrast, the technique for beam pointing the array 1132, for the background area 132 may be more relaxed and simpler with lower gain because the ground hub 410 often in a known, fixed location on Earth is usually equipped with a large aperture featuring high gain and a tracking narrow beam through which the ground hub 410 is often controlling the operation of the UAVs 120. In addition, a ground hub 410 tends to have more powerful receivers (better G/T) and transmitters (higher EIRP) than those in personal devices 633 so that low antenna array 1132 onboard the UAVs 120 can more readily pick up signals from the ground hub 410. However, in alternative embodiments, the beam pointing methods may also be similar for both antenna arrays 124 and 1132. For example, if the UAVs 120 were operating as a relay from ground hub 410 to another ground hub, the beam pointing methodology for both the antenna arrays 124 and 1132 may be similar. Or, if the choice of a nearby ground hub 410 were to change as the UAVs 120 fly to more distant lands, the beam pointing methodology for the antenna array 1132 optionally switches over to the method used for the antenna array 124. On the other hand, if the rescue workers in the foreground area 130 remain in a known location and equipped with better terminals, the beam forming/pointing method for the antenna array 124 may be simplified or adopt the approach used by the antenna array 1132. In many embodiments, the beam forming/pointing functions for the foreground communication antenna arrays 124 are performed by a GBBF 412 in a ground processing hub 410, while the beam forming/pointing for the array 1132 on board an air platform 120 for the background links 450 are performed on board the air platform 120. Beam forming/pointing will also be referred to simply as beam forming.

In one embodiment for optimizing beam forming/pointing, the beam pointing direction of one of the multiple tracking beams generated by the antenna array 124 in FIG. 2 towards particular ground locations or beam spots 1301, 1302, 1303 ("1301" as an example) in FIG. 1, multiple coordinate systems are taken into account in the optimization. The method is partly performed on the UAVs 120 and partly at the ground hub 410; alternatively the method is performed at the ground hub 410 that can be large enough to comprise many high speed processors and large amounts of data storage equipment. The coordinate systems include the Earth reference frame (longitude and latitude coordinates) in which the locations of the ground hub 410 and the beam spots 1301 are stationary and fixed. Another coordinate system is the one on each UAVs 120 that is flying around; this is referred to as the body coordinate system and can be arbitrarily taken to have its origin located at the center of mass of a UAV 120. The body coordinate system is moving with respect to the Earth coordinate system. Moreover, the body coordinate system (the UAV 120) is flying around in various patterns so that it is unlikely that the body coordinate system forms a neat grid with respect to the Earth coordinate system. A third coordinate system is the antenna array 124's coordinate system. The antenna array elements 126 are moving with respect to the body coordinate system; in addition due to variations during manufacturing, the exact location of the antenna array 124 on a particular UAV 120 can differ somewhat from UAV to UAV. As such, the antenna array coordinate system comes into play in optimizing the beam pointing. Part of the optimization involves mapping these different coordinate systems onto, for example, the Earth coordinate system especially if the ground hub 410 processors are performing the work.

Figure 3:
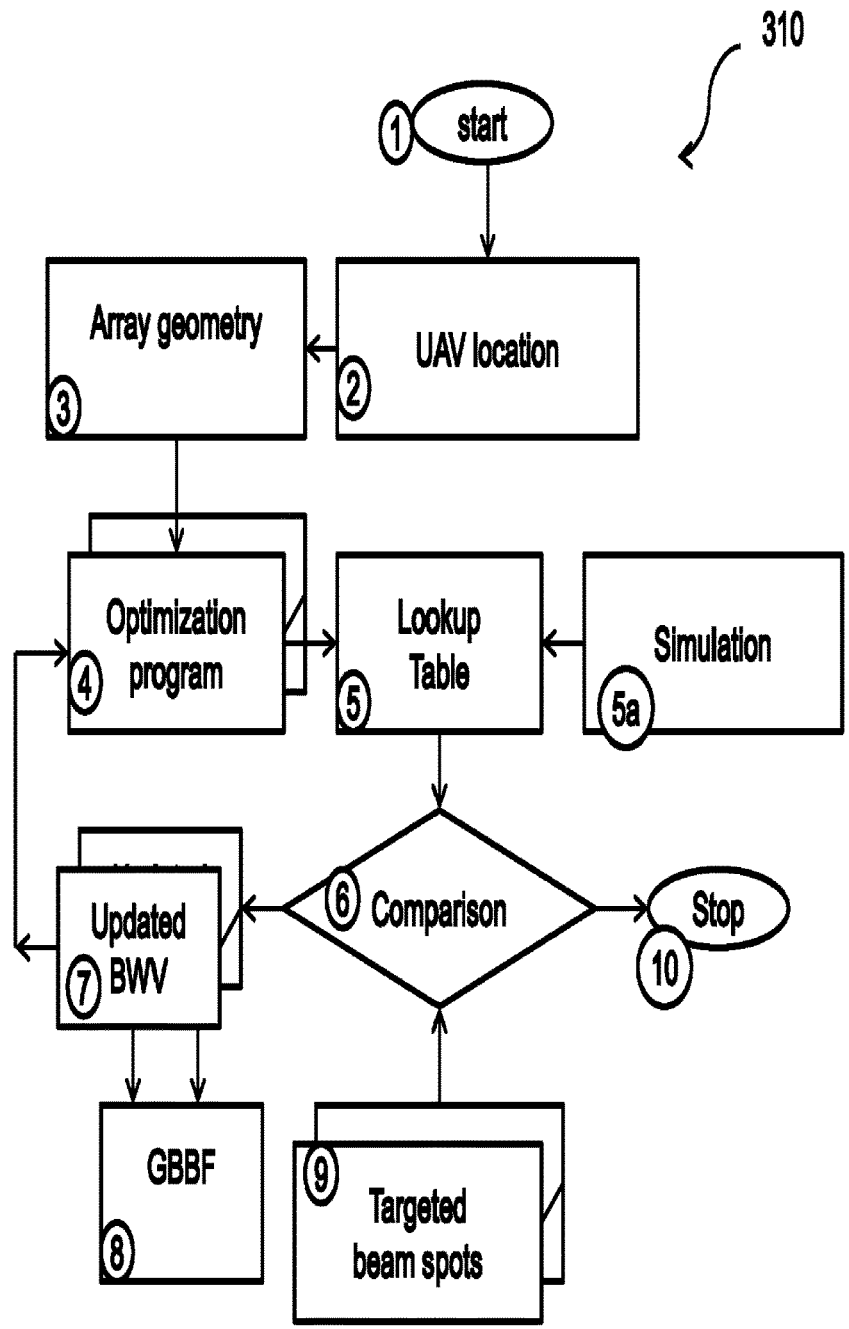
FIG. 3 depicts a flowchart of an embodiment to point an antenna for communications with a foreground region.

FIG. 3 is a flow chart depicting one system 310 to optimally point the foreground antenna beams by mapping the foreground antenna array 124 direction from the UAV 120 body coordinates to the Earth coordinates for communications with devices 633 in the foreground area 130. In the embodiment of FIG. 3, the communications in the foreground area 130 are conducted in the L or S frequency band, and beam forming is performed remotely by using the GBBF 412 in the ground hub 410. To reduce the load on the UAVs 120, the associated beam controller processors to optimize and control the antenna array 124 is residing in the ground hub 410, such as in the GBBF 412. In alternative applications or for more flexibility, the UAVs 120 perform the processing onboard instead. The UAVs 120 have electronics that can perform the function of system 310 as depicted in FIG. 3.

FIG. 3 comprises a position locator system 310 with a comparator in block 6 that checks whether the instantaneous beam position from the antenna array 124 matches well with a desired or target location on the ground (such as beam spot 1301) in the foreground area 130 as the UAV 120 moves. If the mapping or comparison is not well matched or if the UAV 120 moves radically, then the optimization continues to update the parameters until a better match is found and the antenna array elements 126 are then pointed to a new direction. The parameters being updated occurs in the loop formed by blocks 4, 5, 6, and 7. The parameters comprise the beam weight vectors (BWV) or the WF MUX transformation coefficients in the equations going from the input transmitted signals to the output received signals, such as those listed in the equations 1.1-1.4 in the U.S. patent application Ser. No. 13/623,882 that describes wave front multiplexing. Optimal BWV values or WF MUX coefficients yield output received signals that match well with the input transmitted signals (regeneration of the signals received from the foreground region). For example, a good match occurs when the sound of the received phone call mirrors the sound of the initial speech made by the caller. In other embodiments, the BWV values may be considered optimal when the amplitude of the received signals is very strong or the strongest (e.g. loudest).

The position locator system 310 of FIG. 3 is processed, for example, in the GBBF 412 after a UAV 120 transmits various types of information to the GBBF 412. For example, in block 2, the UAV 120 location and orientation are determined by on-board GNSS, accelerometers and gyroscopes, and such information is transmitted to the GBBF 412. In block 3, the position and bearing of the array antenna 124 and its elements 126 are also determined with respect to the body coordinate system of the UAV 120. Since the trajectory of the UAV is known or pre-determined by the GBBF 412, it is also possible to compute the bearing and future orientation of the UAV 120 and the array 124 and elements 126. In the GBBF 412 in block 4, there is an optimization program that is part of a loop formed by blocks 4, 5, 6 and 7. If the UAV 120 is moving or flying relatively slowly or apparently slowly with respect to the Earth, the optimization loop is slowly varying and updating the BWV values. Block 5 comprises a dynamically changing lookup table for selecting proper BWV values by mapping the location of the fixed beam spots 1301 in (longitude, latitude) to the beam pointing directions in the coordinate system of the antenna array 124 and elements 126 in (azimuth, elevation) or ($\alpha$, $\beta$). The lookup table is dynamically updated based on the flight and beam position computer simulations or flight simulations performed in block 5a. For example, the UAV 120 is flying at different altitudes and in a changing pattern so that block 5a performs a dynamic simulation of the flight pattern (body coordinates) that best maps to or fits with the Earth coordinates. One technique is to perform a conformal mapping. If the UAV 120 is flying in a square or rectangular pattern, the mapping to Earth coordinates is fairly uniform across the map grid since Earth is fairly flat when viewed from an altitude close to Earth. But, if the UAV 120 is flying in an odd pattern, e.g. S-shaped pattern, the mapping to Earth coordinates is stretched or contracted in different directions and not uniform. As such a simulation of the optimal mapping is performed dynamically based on the flight pattern of the UAV 120. In block 6, the simulated beam direction based on the current values of the BWVs is continuously compared with the targeted or desired beam spots 1301 in the foreground area 130, obtained from block 9. The values of the BWVs are continuously updated as the anchoring air platform UAV 120 cruises in a flight pattern and the resulting small errors are utilized as diagnostic signals for updating the BWVs for all the array elements 126, or for fine tuning of the respective beam pointing directions of each element 126. In blocks 7 and 8, the optimized BWV values are sent to the digital beam forming processors as periodic updates to the GBBF 412 for it to perform remote beam forming or shaping contours of the shaped beams that are to be transmitted to the foreground area 130. The optimization loop 4-7 will continue to make dynamic adjustments (adjusters) until a flight mission is accomplished or cancelled or until the UAV 120 is out of range, and the loop operation stops in block 10. There are multiple layers in the boxes of 4, 7, and 9, indicating parallel processing for these functions. There may be more than one beam concurrently formed by GBBF 412 for the airborne array 124. Since a BWV dictates only one beam; multiple (N) parallel processors are used for updating multiple (N) concurrent beams in the boxes 4, 7, and 9.

Figure 4A:
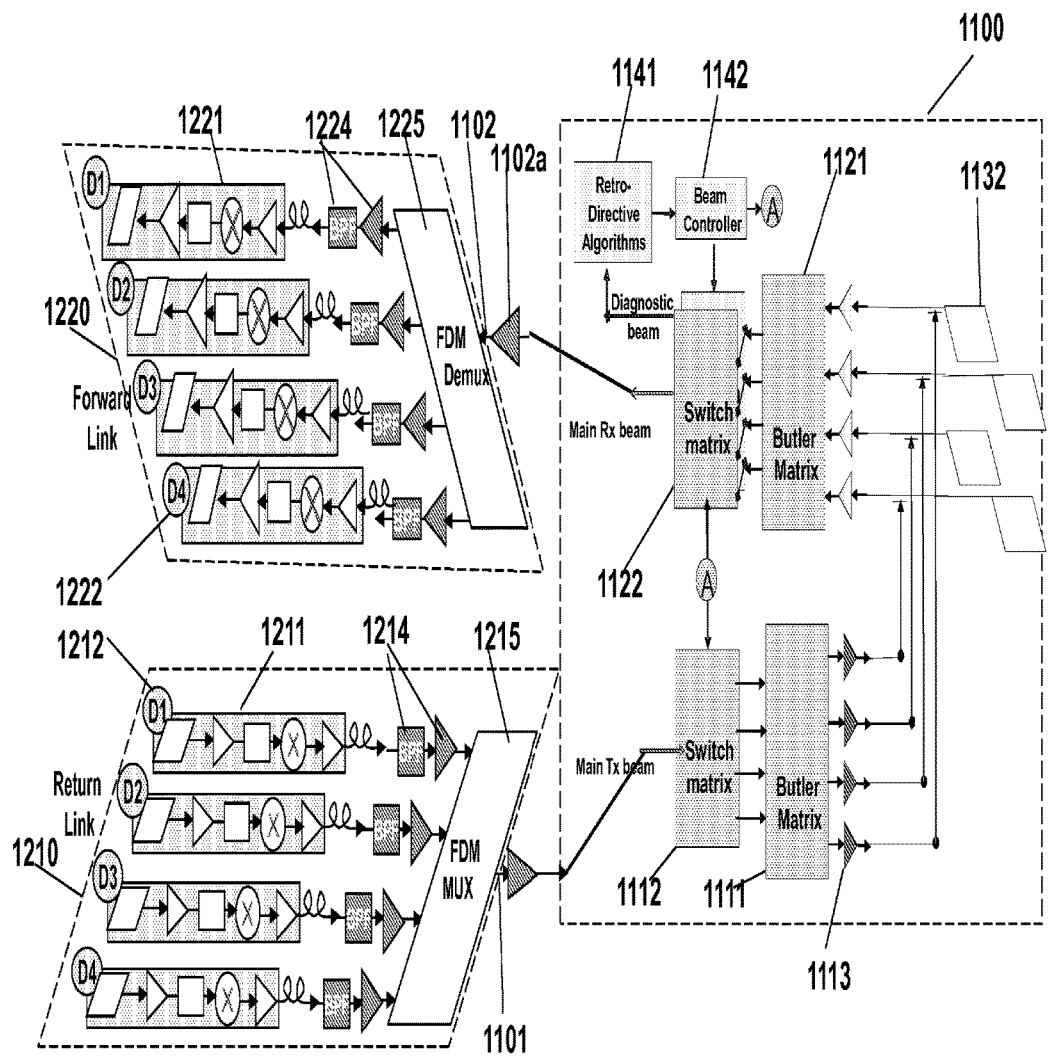
FIG. 4a depicts a block diagram of an analog retro-directive antenna and onboard electronics.
Figure 4B:
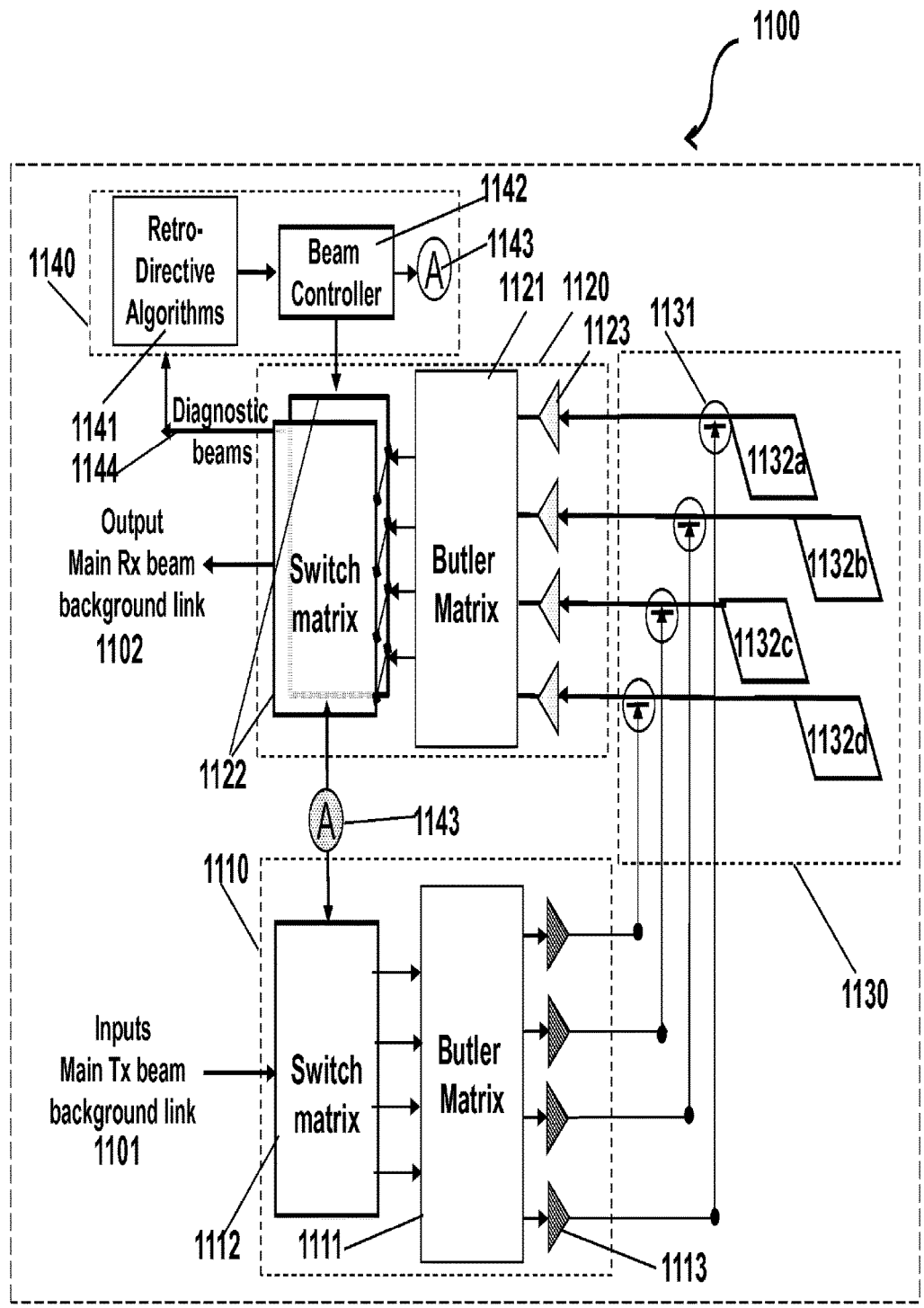
FIG. 4b depicts a block diagram of an analog retro-directive antenna.
Figure 5:
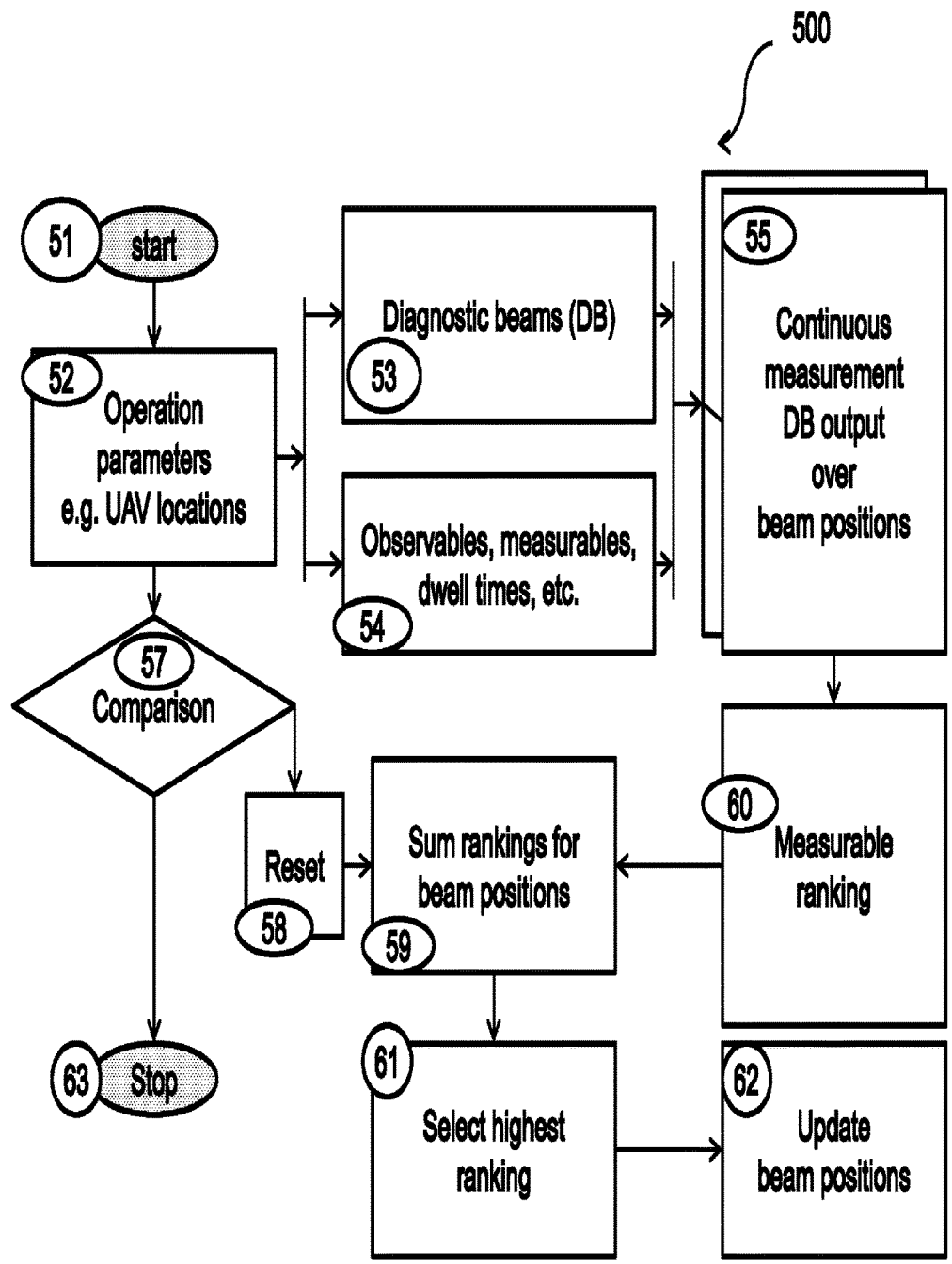
FIG. 5 depicts a flowchart of an embodiment to determine antenna beam or signal positions for communications with a background region.

FIG. 4a and FIG. 4b depict block diagrams of an analog retro-directive antenna RDA 1100 that facilitates the discussion of FIG. 5. An RDA 1100 is onboard the UAV 120 to transmit and receive data through the background links 450 and enable the UAV 120 to communicate with the ground hub 410 in the background area 132 more effectively, using less power, reaching a hub 410 that can be farther away, or providing more data throughput to a nearby hub 410. A RDA 1100 can transmit signals back in the same direction they came from, and in one embodiment, RDA 1100 comprises multiple antenna elements with multibeam beam-forming network (BFN) that concurrently form multiple beams to receive/detect signals from different directions, and the RDA 1100 selects the pointing direction of the beam with the strongest power level of selected features of desired signals as the estimated direction of arrival for the desired signals. The selections among multiple beams are measured multiple times to minimize false decisions. One exemplary method to select the strongest signal among the multiple outputs from a multibeam BFN, a M-to-M Butler matrix (BM) 1121, is based on determining the angles of arrival of the desired signals on the RDA 1100. There are M array elements connected to the M-to-M Butler matrix, and M outputs from the Butler matrix. Each of the outputs corresponds to one received beam signal of the M concurrent received beams, pointing to M various receiving directions with different finite beamwidths, altogether covering a large field of view (FOV) when taken together. By measuring the received desired signal strengths with certain desired signal signatures/identifiers, including signal patterns in frequencies, time slots, unique diagnostic codes, or modulation schemes from the M-output ports of the M-to-M Butler matrix, the angle of arrival for the desired signal is estimated by identifying one of the output ports featuring the strongest intensity with unique signal signatures/identifiers. Its pointing direction will be the estimated angle of arrival. There is a beam controller (e.g. 1142 in FIG. 4a and FIG. 4b) that is onboard the UAV 120 to select the strongest signal based on a ranking system, such as ranking the angles of arrival. Alternatively, the ranking includes ranking the time of arrival of the desired signals.

In FIG. 4b, the retro-directive antenna RDA 1100 transmits and receives in the Ku/Ka frequency band for the background area 132 communications. RDA 1100 comprises multiple (e.g. four) antenna array elements 1132 that have a low-profile and near conformal design. Each received beam generated by a 4-beam beam-forming network (BFN), a 4-to-4 receiving Butler matrix 1121, connected to the four antenna arrays elements 1132 is set to point in a different direction (position) in space and receive signals from that direction. Similarly, each transmitting beam formed by a 4-beam beam-forming network (BFN), a 4-to-4 transmitting Butler matrix 1111, connected to the four antenna arrays elements 1132 is set to point in a different direction (position) in space and transmit signals to that direction. In one embodiment, these arrays elements 1132 include a subarray, each pointing to a direction such as east, southeast, south, southwest for field of view enlargement. However, it is also possible to set up the array elements 1132 so that they are aligned and pointed to a boresight of the entire RDA 1100. For example, a 4-element low-profile planar array with total aperture dimension of 0.5 wavelength in free space and with 0.5 wavelength microstrip elements on a material with dielectric constant of approximately 1, features a field of view of about 120 degrees.

In RDA 1100, the received signals from the four antenna arrays elements 1132 are captured and amplified by LNAs 1123 before sent to the receiving multi-beam forming processing that is performed by a 2-dimensional Butler matrix BM 1121, followed by a pair of switching matrices ST 1122 (one depicted behind the other in FIG. 4). The first 4-to-1 switch ST matrix 1122 in the front is to connect desired received signals to main signal path 1102, while the second 4-to-1 switch ST matrix 1122 in the back is for diagnostic functions connecting diagnostic processor 1140 to different signals coming from various signal directions. both are connected to a 2-by-2 to 2-by-2 Butler matrix In many other embodiments, the second switch matrix in the back may be a 4-to-2 ST featuring 4 inputs and 2 outputs. As a result, there will be two concurrent outputs in the diagnostic beam port 1144. The box 1141 will also perform weighted sum on these two concurrent outputs in the diagnostic beam port 1144, forming various composite diagnostic beams. This simple processing will "create" many more concurrent beams pointing to different beam positions than 4, which is what the 2-by-2 to 2-by-2 Butler matrix can generate concurrently. A 2-by-2 to 2-by-2 Butler matrix can generate 4 orthogonal beams concurrently. These techniques will allow operators to generate 4, 8, 12, and many other concurrent beams with peaks pointing to various directions. However, only 4 of them are mutually orthogonal to one another.

In the forward link direction (from the background area 132 to the foreground area 130 via the UAV 120), the first ST 1122 operates in the main signal path that is electrically coupled to the interface 1102 via a buffer amplifier 1102a. The first ST 1122 is controlled by a beam controller 1142 that decides which beam among the four outputs of the BM 1121 to select. The four outputs correspond to four separate beam positions (four directions covered by all four array elements 1132) that constitute the entire field of view of the RDA 1100. For example, the four beam positions (four panels of 1132) formed by the BM 1121 and the four elements centered in a squared lattice spaced by a half wavelengths for two adjacent elements, using the notation of [elevation, azimuth] in an UAV 120 coordinate system, are set at [30°, 30°], [30°, −30°], [−30°, 30°], and [−30°, −30°]. Each beam output from the array 1132 is associated with a beam position having a 3 dB beam-width (cone diameter) covering about 60 degrees. As the UAV 120 moves and/or its orientation changes, the relative position and direction of a desired GBBF facility 412 is also altered in the UAV 120 coordinate system, but the position and direction of a GBBF facility 412 should be within at least one of the four possible beam positions covered by the array panel 1130. If there are two GBBF facilities 412, two of the four beams by the 4-element array 1132 might be pointing to two different facility 412 concurrently.

The UAV 120 points its main beam position to the selected GBBF facility 412 via a second ST 1122 that will be continuously switching received signals among the four outputs of the BM 1121 to a retro-directive analysis block 1141, or a diagnostic block 1141, to help determine the currently-best beam position to select based on the strength of the received signals which were originated from the GBBF facility. The selection of the currently-best beam from among the four is made based on information derived from the second of the two switch matrices ST 1122 that is also controlled by the beam controller 1142. The second ST 1122 is continuously switched among all of the four possible beam positions and the second ST 1122 uses short dwell times (on the order of milliseconds) that are long enough to detect/sample the desired signal characteristics originated from the GBBF facility. The signals collected by various inputs of the second ST 1122, which are connected to the outputs of the 4-to-4 BM 1121, are sampled sequentially by an on-board processor (diagnostic analysis block 1141), and compared with the desired signals "signatures/identifiers" known a priori to identify a beam position that is currently associated with the strongest signal level of a desired signal. The signatures/identifiers of the desired signals may have many characteristics associated with desired signals such as the frequency format and encoding (e.g. FSK or QAM), acquisition sequences, or unique header or trailing sequences in the information packages; and others. The beam controller 1142 then informs both the transmit switch ST 1112 and the other receive ST 1122 (first of the two Rx ST 1122) which is the currently-best beam position choice for the retro-directive antenna RDA 1100.

FIG. 5 depicts an embodiment of a ranking system 500 to optimize the selection of beam positions for different angles of arrivals of the received signals captured by the array comprising of 4 elements 1132a, 1132b, 1132c, 1132d in a retro-directive antenna RDA 1100. The array elements or subarrays 1132a, 1132b, 1132c, and 1132d feature low gain and broad beam-width and may be set up to point toward different directions in space for enlarged field of view. However, the received beams formed by the array comprising of many non-parallel array elements or subarrays may features concurrent receiving beams pointed toward different locations of different ground hubs 410.

The flow chart in FIG. 5 illustrates an exemplary ranking system 500 based on determining angles of arrivals of desired signals on-board the UAV 120. It is based on multiple independent readings/samples from at least one diagnostic beam to minimize false decisions on estimating the angle-of-arrivals from observations and measurements of received signals. Each of the diagnostic beams is continuously observing the outcomes from all possible beam positions in a diagnostic frame time. The processor 1140 will rank the likelihood of the arrival of a desired signal from all possible beam positions in a time frame for a diagnostic cycle. The most likely, the second most likely, and the third most likely beam position associated with the angle of arrival will be given a rank of 3, 2, and 1 respectively. All other beam positions will be assigned with a rank of "0". Total sum of all assigned rank in a diagnostic cycle for a diagnostic beam will be 6; a fixed number. The processor performs additional independent observations of the strength of received desired signals and ranking them among all possible beam positions in subsequent diagnostic cycles. In an embodiment with 8 beam positions, there are 50 diagnostic cycles for each diagnostic beam in a diagnostic period of 1 second. There are two diagnostic beams. There will be 100 independent ranking measurements for the likelihood of angle of arrival observations in terms of beam positions in 1 second. There will be a total sum of the ranks of 100*6=600. In this example, any beam position that is associated with a sum of the ranks greater 300 will be declared as the estimated angle-of arrival in terms of beam positions.

In blocks 51 and 52, the electronics starts by obtaining various operation parameters such as the position of the UAV 120 from GPS and other instruments such as accelerometers. In block 57, a decision is made whether the ranking system 500 should proceed or be turned off (block 63) or reset in block 58. The decision can depend on factors such as the UAV 120 location, a command from ground control or from a pilot. If the ranking system 500 should proceed, then block 52 sends relevant position and orientation information to blocks 53 and 54. A beam controller 1142 identifies the dynamic status of one of the UAVs 120, the anchoring UAV 120, such as its location (in block 52). In addition, in block 53, the beam controller 1142 also checks the current number of beam positions (arrays) that are available for diagnosis to determine the best angle of arrival based on the particular geometry of the RDA 1100 and bearing of the RDA 1100 or UAV 120. In block 54, different observable variables and measurements for the observable variables are considered. Observable variables include the received signal power or signals with identifiable waveform features such as amplitude or frequency. The number of independent measurements or samples taken into consideration for ranking purposes depends on how fast the variables are changing. For example, ten beam positions from the array made from element 1132a, 1132b, 1132c, and 1132d are considered. When the UAV 120 makes sudden maneuvers, then it is usually better to measure the observables more often or over many beam positions (directions) or over a longer dwell time period. When the UAV 120 is merely cruising smoothly, it may be sufficient to measure the observables over only a few adjacent beam positions (directions) around the current beam position for active array consisting of element 1132a, 1132b, 1132c, or 1132d. Block 55 continuously measures or samples the signals from a diagnostic beam hopping over all selected beam positions generated by the array. In block 60, averaged or global measured values are generated by ranking the measured values from blocks 54 and 55 within a time frame of a diagnostic cycle, such as within 10 milliseconds (ms). Within each time frame (i.e., a subframe) of a diagnostic cycle, the diagnostic beam samples all 10 beam positions for a finite dwell time (e.g. 1 ms) on each beam position as identified in block 55. For instance, a beam position with the strongest received power of desired signals is ranked with an index of 5, a second beam position with the second strongest received power is ranked with an index of 3, another beam position with third strongest received power is ranked with an index of 1, and the rest of the beam positions are all ranked with an index of 0. The sum of the index rankings for all beam positions is then 9 for each subframe. In block 59, with 100 subframes in a diagnostic period of 1 second as an example, the total sum of the rank-indices, or ranking sum, is then 900. Each of the 10 beam positions in a subframe of 10 ms, or a time frame of a diagnostic cycle, is associated with a ranking sum of 9, regardless of the absolute received power levels of desired signals. In block 61, the pointing direction of the beam position with the highest ranking sum over a diagnostic period, or with the ranking sum greater than 450, is identified as the direction of the arrival of the desired signals originated from a ground facility 410. Then this particular ground hub 410 associated with the arrival of the strongest signal is selected, based on the selected position/status of the ST 1122, as a background area with which the UAV 120 will communicate.

In block 62, the RDA 1100 is configured according to the most up to date selection of the best beam position. Block 52 via block 57 can optionally issue a stop command, block 63 such as when the UAV 120 is no longer in motion or when the ground hub 410 terminates the procedure of system 500. Otherwise, the entire ranking system 50 procedure is then repeated. The procedure can be implemented either as circuits or as software residing in the beam controller 1142 or in a separate electronic processor on the UAV 120. Alternatively, the UAV 120 is controlled remotely and the ranking system 500 is located in some ground location or ground hub 410.

The foregoing discussion on positioning the UAVs 120 and pointing the communication antennas (e.g. 124 and 1132) enhance the optimal performance of the airborne communication system 100. To further optimize the performance, there are calibration and compensation procedures for system 100, the RDA 1100, and systems 10 and 50. In one embodiment, calibration is performed for the electronics on individual air vehicles UAVs 120 that transmit/receive communication signals. The background link 450 to ground hub 410 is also calibrated. In another embodiment, calibration is also performed for distributed transmission or receptions of communication signals: e.g. distributed antenna arrays, where the sub-arrays are located on different air vehicles UAVs 120 so that the UAVs 120 are cross-correlated. In distributed arrays, the power of the signals transmitted from the multiple UAVs 120 is coherently combined; in this scenario, an UAV 120 is calibrated either continuously in real time and/or upon an occurrence of a particular event and/or upon startup. For example, an occurrence where an UAV 120 that is performing differently or unexpectedly, may require a calibration or a calibration on-demand. The calibration is computed and controlled in the ground hub 410, in the background region 132. Alternatively, the calibration is performed and controlled on-board an UAV 120.

In the embodiment where calibration is performed for a distributed airborne array (distributed UAVs) 120 and where a ground hub 410 performs the calibration, the ground hub 410 processors account for geometric effects, where the geometry of the distributed UAV array 120 appears to be altered. For instance, the physical geometry, distance to a foreground area 130 or to a background area 132, location and distance among the UAVs 120, and orientation of an antenna array on board the UAVs 120 would alter the apparent geometry among the distributed UAV array 120. Other factors also alter the geometry, such as imbalanced electronic channels due to aging electronics or due to electronic mismatches. These geometrical effects would affect the signal propagation time or cause delays and amplitude and phase shifts among the sub-arrays. Based on this information, a real time continuous calibration method compensates for the geometric effects. The calibration includes adjustments for geometry (time delays, and amplitudes and phases among the sub-arrays, and so on). Calibration is performed partly by modifying the beam weight vectors BWVs or WF MUX coefficient because the BWVs are dependent on factors such as the array geometries as noted in U.S. patent application Ser. No. 13/623,882.

Figure 6A:
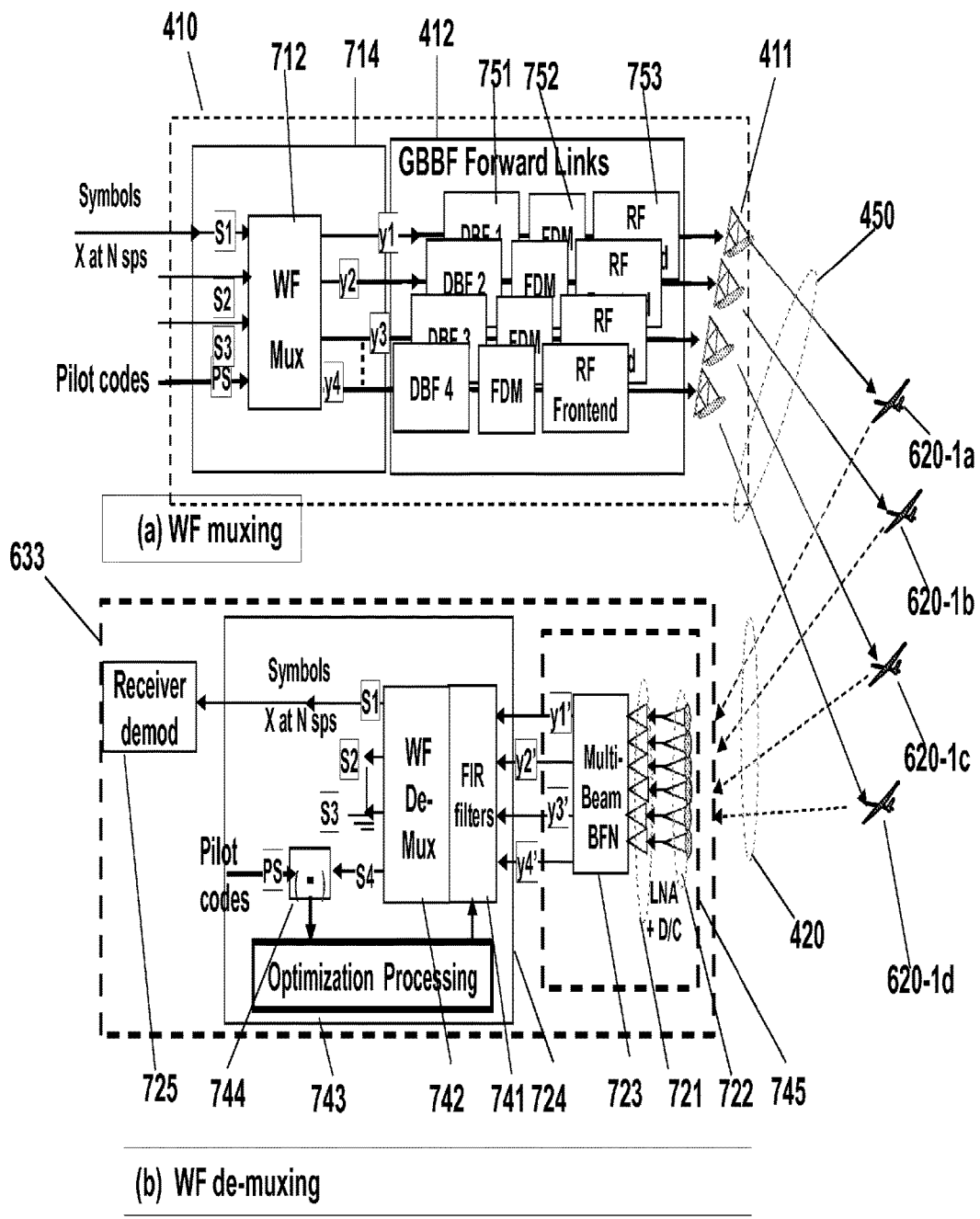
FIG. 6a depicts an embodiment of a multi-channel (e.g. four UAVs) forward link transmission that includes a WF mux module, a GBBF processing, and a multi-beam array or equivalent multiple high gain antennas, all located in the ground hub. It also depicts exemplary user terminals with multiple receiving array and a WF demux with adaptive equalizers.

FIG. 6a depicts an embodiment of the electronics in a forward link. FIG. 6a depicts a multi-channel (e.g. four) forward link transmission that includes a WF mux module 714 prior to a GBBF 412 and multi-beam array 411, all located in the ground hub 710. Alternatively, the UAVs 120 have electronics that can perform the function of the WF mux system as depicted in FIG. 6a. WF mux module 714 has four input signals, slices S1, S2, S3, and pilot code PS. WF mux module 714 has four outputs or wavefront components (wfc) y1, y2, y3, y4. These wfc signals are processed by a GBBF 412 that includes digital beam forming in 751, multiplexing (e.g. FDM) in 752, and frequency conversion and amplification in 753. The GBBF 412 processing is performed either in software where an analog-to-digital converter or digital-to-analog converter circuits may be present to convert analog signals to digital and/or vice versa. Alternatively GBBF 412 is performed in hardware with electronic circuits, integrated circuits, to perform the functions of beam forming, multiplexing etc. GBBF 412 generates WF MUX beam signals that are radiated by the antennas 411. The WF MUX beam signals are uploaded or uplinked to the UAVs 620-1 using the background link 450. The inputs to the four DBFs 751 are the wfc (y1, y2, y3, and y4) signals.

Continuing in the forward link embodiment of FIG. 6a, in the lower part of the drawing, the UAVs 620-1 transmit signals through the forward link 420 to the foreground area 130. In one embodiment, the terminal 633 in the foreground area 130 has a multi-beam receiver 745 with antenna array elements 722. Each antenna array elements 722 is followed by a LNA and frequency down converter 721 to amplify and condition the received signals. The conditioned received signals are sent to a multi-beam beam forming network BFN 723 that forms multiple tracking beams based partly on the flight pattern dynamics of the relaying UAVs 620-1 and also on the information encoded in the beams. The outputs of the multi-beam BFN 723 are y1', y2', y3', and y4' that originated from signals of y1, y2, y2, and y4, respectively, but are now contaminated by noises and interference. The received signals y1', y2', y3', and y4' are sent to a baseband processor 724 comprising a bank of four adaptive equalizers 741 and a 4-to-4 WFdemux 742. The outputs of the WFdemux 742 comprise the recovered three slices of signal streams S1, S2, S3 and a stream of pilot codes PS. The recovered signals S1, S2, S3 may be designated for different end users in the foreground area 130; e.g., each stream constitutes a phone call.

In operation, the terminal 633 tracks signal beams from the multiple (e.g. four) UAVs 620-1, concurrently. Terminal 633 receives signals from four concurrent wireless links: link 420a to UAV M1a 620-1a, link 420b to UAV M1b 620-1b, and so on. WF muxing/demuxing compensates for the cumulative phase and amplitude imbalances among the four propagation paths and the associated electronics. The links 450 are in the Ku/Ka band, and the links 420 in L/S band. The four paths are 450a plus 420a; 450b+420b; 450c+420c; and 450d+420d. The Ku/Ka band channels in the background links 450 have adequate instantaneous bandwidths to support all four M1 UAVs 620-1, concurrently. These techniques may include employing advance multi-beam antennas 411 in the ground hub 710 that provides orthogonal beams to the UAVs 620-1 to facilitate frequency reuse improving isolations among the parallel Ku/Ka links 450.

In an alternative embodiment the electronics and wave front multiplexing techniques residing in the foreground terminals 633 are actually located on the UAVs 620-1. The UAVs are then able to communicate signals with the foreground region where people use commonly available communication devices that are not equipped with wave front multiplexing electronics and software.

In one operational embodiment, the distance among the UAVs 620-1 is varied slowly so that the path lengths changes, a variation that is accounted for in performing coherent power combining. The relative geometries among the UAVs 620-1 is continuously calibrated and then compensated for in the forward link. The use of WF muxing/demuxing 712 and 742 along with adaptive equalization by adaptive FIR filters 741 dynamically compensates for differences in the amplitudes and phases among the four propagation paths, which enables continuously maintaining the coherency among the signals that are relayed by the four independent UAVs 620-1. This operational scenario allows the coherent addition of the stronger radiated signals from the multiple UAVs 620-1 to improve SNR and/or to overcome signal transmission obstructions. In this example, the coherent combining is not through spatial combining in free-space, but is accomplished in the WF demux processor 742 at the receiver site 633.

Regardless whether there is variation among the UAV distances, the signals transponded by (uplinked then re-transmitted) the four UAVs 620-1 are detected and amplified by the multi-beam receiver 745. The receiver 745 concurrently receives signals, y1', y2', y3', and y4' that are the transponded signals of y1, y2, y3, and y4 with possible additional noise and cumulative differences in phases and amplitudes due to the four UAVs 620-1, electronics, and/or atmospheric effects. The WFdemux 742, along with the finite-impulse-response (FIR) filters 741, equalizes the propagation paths of the forward link to compensate for phase imbalances and amplitude differences in any of the segments traversed; the uploading background segment, airborne segment, or foreground receiving segment. During equalization, the coefficients of the FIR filters 741 are optimized by an iterative control loop based on comparisons of the recovered pilot codes PS against the original PS codes that were transmitted. PS is a known diagnostic signal that traversed along with desired signals S1, S2, and S3 concurrently through all the same bent pipe paths and the control loop and electronics and thus serves as an efficient optimization observable in the optimizer 724.

In one embodiment of the optimization control loop, the adaptive equalizers are implemented, for example, as finite-impulse-response (FIR) filters with adaptive filter coefficients that are adjusted by an iterative optimization loop using an optimization processor 743. As an example, the optimization loop is based on a cost minimization algorithm using steepest descent principles. Alternative methods to optimize the coefficients include maximum likelihood or least squares fit. In one configuration, the optimization loop in the baseband processor 724 comprises signals traversing (1) adaptive equalizers 741, (2) a WF demux 742, (3) comparators or cost functions generating processor 744, and (4) an optimization processor 743 having outputs of the updated coefficients for the adaptive equalizers 741. The main or feed forward path comprises the adaptive equalizers 741 and the WF demux processor 742. The feedback path includes the comparators 744 and the optimization processor 743.

A total cost (an estimator of the best solution for the filter coefficients) is obtained through an iterative optimization loop. A known pilot signal PS was originally transmitted by the ground hub 710. The known pilot signal PS underwent the WF MUX processing procedure in ground hub 710 and is now to be recovered in the user terminal 633. The recovered PS value is compared to the original, known PS value, as a diagnostic tool to evaluate the total cost and produce the best filter coefficients. The "best" filter coefficients comprise the solution where the recovered PS value and the original PS value matches closely. The coefficients are dynamically calculated by comparing at 744 the recovered pilot codes with the known PS sequences. The comparison is characterized by a "cost function" or measurable that is assigned to the diagnostic observable pilot codes. The cost function serves the purpose of a Chi-square test or maximum likelihood function in statistics and probability analyses. The cost function is a positive valued number that changes and the value indicates whether an optimal solution for the coefficients has been reached in an iterative process. The total cost is the sum of all cost functions and comprises a non-zero positive number, representing current status of optimization loop. When the total cost value is large, the adaptive equalizers are far from a desired (or optimal) performance. On the other hand, smaller values indicate that the adaptive equalizers are reaching an optimal state. At a fully optimized state when the total cost value is substantially zero, the outputs of the WFdemux 742 are taken to be the recovered input signals S1, S2, S3, and PS. As such, the pilot code PS signal is a diagnostic signal stream that aids the reconstruction of the user transmitted signals S1, S2, S3. Because the S1, S2, S3, PS signals are recovered at the terminal 633, the same notation is used for the signals at the outputs of the WFdemux module 742, as at the inputs of the WFmux 712, in FIG. 6a.

In another embodiment, the cost minimization includes identifying multiple relevant variables or observables to provide to the processor 743. The relevant observables include the difference between the recovered pilot signal stream S4 and the original PS. The relevant observables also include the correlations of the signals S1, S2, S3, S4 at the output of the WFdemux 742. Then (point A), different cost functions are generated based on the various the observables, which includes converting or mapping the observables into different measurable variables or cost functions. When an observable meets the desired performance, the corresponding measurable or cost function moves towards zero. When an observable is slightly away from the desired performance, the corresponding measurable or cost function is assigned a small positive number. When an observable is far away from the desired performance, the corresponding measurable or cost function is assigned with a large positive number. The sum of all cost functions yields a total cost value that defines a numerical indicator of the current status of the optimization loop performance. If the total cost value is less than some small positive threshold value, then the optimization loop is stopped and the coefficients existing in that iteration of the loop become the "best" coefficients. Otherwise, the iteration continues, and the derivative or gradient of the total cost with respect to each coefficient (of the FIR filter 741) is calculated. New coefficients are calculated iteratively based on a steepest descent algorithm to minimize the total cost value during the optimization loop. Upon each iteration of the loop, the coefficients are updated, and then the loop returns to point A. Thus in this embodiment, the total cost value converges toward zero, but does not have to become zero for an optimal solution to be obtained.

In different embodiments, WFdemux 742 is implemented using a FFT fast-Fourier transform or DFT (Discrete Fourier transforms), a Hadamard matrix in a digital format, or combinations of a FFT and Hadamard matrices. Alternatively a WFmux 712 or WFdemux 742 is constructed using a Butler Matrix (BM) made with analog circuits having passive components. In FIG. 6*a*, a 4-to-4 WFmux 712 and a 4-to-4 WFdemux 742 are implemented, although a number of channels other than four may be selected also.

One way to implement WF MUX technology can be described mathematically at each stage of the electronics. For instance, the outputs y1, y2, y3, and y4 of the WFmux 712 are the weighted sums of the inputs S1, S2, S3, and PS:

$$y1(t)=w11*s1(t)+w12*s2(t)+w13*s3(t)+w14*ps(t) \quad (1.1)$$

$$y2(t)=w21*s1(t)+w22*s2(t)+w23*s3(t)+w24*ps(t) \quad (1.2)$$

$$y3(t)=w31*s1(t)+w32*s2(t)+w33*s3(t)+w34*ps(t) \quad (1.3)$$

$$y4(t)=w41*s1(t)+w42*s2(t)+w43*s3(t)+w44*ps(t) \quad (1.4)$$

where, $s1(t)=S1$, $s2(t)=S2$, $s3(t)=S3$, and $ps(t)=PS$; and "t" is the time or digital sample index; and the coefficients w11, w12, etc., are fixed-valued weights. Thus, S1 appears in all of the outputs y1, y2, y3, and y4. Similarly for the other inputs S2, S3, and PS, each appears in every one of the four outputs.

A wavefront vector (WFV) having four components is a column matrix whose elements are the weight coefficients:

$$WFV1=WF1=\text{Transpose of } [w11,w21,w31,w41] \quad (2.1)$$

$$WFV2=WF2=\text{Transpose of } [w12,w22,w32,w42] \quad (2.2)$$

$$WFV3=WF3=\text{Transpose of } [w13,w23,w33,w43] \quad (2.3)$$

$$WFV4=WF4=\text{Transpose of } [w14,w24,w34,w44] \quad (2.4)$$

where WFX*WFY=1 if X=Y, otherwise WFX*WFY=0; where X and Y are integers from 1 to 4. Thus, the four WFV vectors (column matrixes) are set up mutually orthogonal by choice. WF1 is associated with signal stream S1, WF2 with S2, WF3 with S3 and WF4 with PS.

Similarly, the outputs of the WFdemux 742, s1, s2, s3, and s4 are weighted sums of the inputs y1', y2', y3', and y4':

$$s1'(t)=w11'*y1'(t)+w21'*y2'(t)+w31'*y3'(t)+w41'*y4'(t) \quad (1.5)$$

$$s2'(t)=w12'*y1'(t)+w22'*y2'(t)+w32'*y3'(t)+w42'*y4'(t) \quad (1.6)$$

$$s3'(t)=w13'*y1'(t)+w23'*y2'(t)+w33'*y3'(t)+w43'*y4'(t) \quad (1.7)$$

$$s4'(t)=w14'*y1'(t)+w24'*y2'(t)+w34'*y3'(t)+w44'*y4'(t) \quad (1.8)$$

where, $s1'(t)=S1$, $s2'(t)=S2$, $s3'(t)=S3$, and $s4'(t)=PS$; and "t" is the time or digital sample index; and the coefficients w11', w12', etc., are fixed weights. Thus, y1' appears in all of the outputs S1, S2, S3, and S4. Similarly for the other inputs y2', y3', and y4', each appears in every one of the four outputs. Moreover, the weights w11', w12', etc., are usually adjusted upon each iteration of the optimization control loop. And, the notation S1, S2, S3, S4 is reused because after the error correction and optimization is performed, the outputs of the WFdemux 742 should be substantially similar to the inputs for the WFmux 712.

In addition at a user terminal 633, $$y1'=[a1*\exp(j\,\Phi a)]*y1=a1*\exp(j\,k*z1+p1)*y1 \quad (1.10)$$

$$y2'=[a2*\exp(j\,\Phi b)]*y2=a2*\exp(j\,k*z2+p2)*y2 \quad (1.11)$$

$$y3'=[a3*\exp(j\,\Phi c)]*y3=a3*\exp(j\,k*z3+p3)*y3 \quad (1.12)$$

$$y4'=[a4*\exp(j\,\Phi d)]*y4=a4*\exp(j\,k*z4+p4)*y1 \quad (1.13)$$

where "j" designates the imaginary part of a number, and $\Phi a$, $\Phi b$, $\Phi c$, and $\Phi d$ are the cumulative phases incurred as a signal goes through different electronics and various segments of the bent pipe propagation paths. And, "k" is the wave number index and equals to $2\pi/\lambda$ where $\lambda$ is the wavelength associated with the signal frequency. Further, z1 is sum of path lengths 450*a* and 420*a* for UAV 620-1*a*, a1 and p1 are amplitude and phase imbalances associated with the electronics or obstacles along the path; z2 is sum of path lengths 450*b* and 420*b* for UAV 620-1*b*, a2 and p2 are amplitude and phase imbalances; z3 is sum of path lengths 450*c* and 420*c* for UAV 620-1*c*, a3 and p3 are amplitude and phase imbalances; and z4 is sum of path lengths 450*d* and 420*d* for UAV 620-1*d*, a4 and p4 are amplitude and phase imbalances. When z1=z2=z3=z4=0, p1=p2=p3=p4=0, and a1=a2=a3=a4=1; then; $s1'(t)=c*s1(t)$, $s2'(t)=c*s2(t)$, $s3'(t)=c*s3(t)$, and $s4'(t)=c*s4(t)$, where c is a constant.

Furthermore, Equation (1.5) to (1.8) can be written as $$s1'(t)=w'11*y1(t)+w'21*y2(t)+w'31*y3(t)+w'41*y4(t) \quad (1.5a)$$

$$s2'(t)=w'12*y1(t)+w'22*y2(t)+w'32*y3(t)+w'42*y4(t) \quad (1.6a)$$

$$s3'(t)=w'13*y1(t)+w'23*y2(t)+w'33*y3(t)+w'43*y4(t) \quad (1.7a)$$

$$s4'(t)=w'14*y1(t)+w'24*y2(t)+w'34*y3(t)+w'44*y4(t) \quad (1.8a)$$

where $$w'11=[a1*\exp(j\,\Phi a)]*w11 \quad (1.9a)$$

$$w'21=[a2*\exp(j\,\Phi b)]*w21 \quad (1.9b)$$

$$w'31=[a3*\exp(j\,\Phi c)]*w31 \quad (1.9c)$$

$$w'41=[a4*\exp(j\,\Phi d)]*w41 \quad (1.9d)$$

The wavefronts associated with S1, S2, S3, PS may suffer some distortion while traversing through the electronics and atmosphere. As a result, the wavefront vectors associated with the various data streams become mutually non-orthogonal, and there may be cross talk or signal leakages among the output channels in the reconstructed signals.

$$S1'=c*S1+\Delta21(S2)+\Delta31(S3)+\Delta41(PS) \quad (1.10a)$$

$$S2'=c*S2+\Delta12(S1)+\Delta32(S3)+\Delta42(PS) \quad (1.10b)$$

$$S3'=c*S3+\Delta13(S1)+\Delta23(S3)+\Delta43(PS) \quad (1.10c)$$

$$S4'=c*PS+\Delta14(S1)+\Delta24(S2)+\Delta34(S3) \quad (1.10d)$$

where the notation "Δ21" refers to leakage coefficient from the second channel to the first channel; "Δ31" refers to the leakage coefficient from the third channel to the first channel, and so on. After equalization, the wavefront vectors become substantially mutually orthogonal, so that there is substantially no cross talk or signal leakage in the reconstructed signals.

In an application, in the ground hub 710 in FIG. 6a, the four wfc outputs y1, y2, y3, and y4 from the WF mux 712 are processed by the GBBF 412. Using an array with M elements on board each of the four UAVs 620-1, as an example, each of the four DBF processors 751 comprises M beam-formed element signal outputs. Each of the four FDM 752 performs multiplexing on M outputs, generating a single signal stream that is frequency up converted and power amplified by a RF frontend 753 before being transmitted by one of the four beams generated by the antennas 411 to a designated UAV 620-1. The antennas 411 have high gain and operate in the Ka/Ku frequency band, for example. There are also Ka/Ku antennas 236 on each UAV 620-1 to receive the uplinked signals. By arbitrary designation, the UAVs 620-1 relay the signals so that y1 is delivered to the user terminal 633 via the first UAV 620-1a, y2 via the second UAV 620-1b, y3 via the third UAV 620-1c, and y4 via the fourth UAV 620-1d. Because each wavefront component wfc y1, y2, y3, y4 is a weighted sum of the inputs, S1 is relayed concurrently to the designated user terminal 633 by four separate UAVs 620-1 through a common frequency slot. Similarly, S2 is relayed to a second user by four separate UAVs 620-1 through the same common frequency slot. The second user is collocated in the same beam region 1302 as that of the first user. Similarly, S3 is relayed to a third user in region 1302. In this embodiment, each UAV 620-1 also power amplifies the transponded signals it receives before re-radiating the signals to the three designated terminals 633 respectively; a first one for reception of a first composited signal of S1+S2+S3+PS, a second one for reception of a second composite signal of S1−S2+S3−PS, a third one for reception of a third composited signal of S1+S2−S3−PS, and a forth one for reception of a fourth composited signal of S1−S2+S3−PS.

In this example, each of the three users in the same beam region 1302 concurrently receive his own signals transmitted in the same frequency slot through the same four propagation paths from a common ground hub 710. The three signals and a pilot signal are WF muxed with four mutually orthogonal WF vectors in a 4-D space, where each dimension of the 4-D space is a propagation channel of a WF vector. Thus the four components of all four WF vector are concurrently sent through four different paths; each component of all four WF vectors are aggregated and sent through a UAV 620-1. At the destination where the terminals 633 are located, the cumulative phase and amplitude differences among the components of a WF vector are removed through adaptive equalization and WF demuxing. The outputs of each WF demux for each terminal 633 become the recovered input signals (S1, S2, S3), if the cumulative phase and amplitude differences are substantially fully equalized.

Figure 6B:
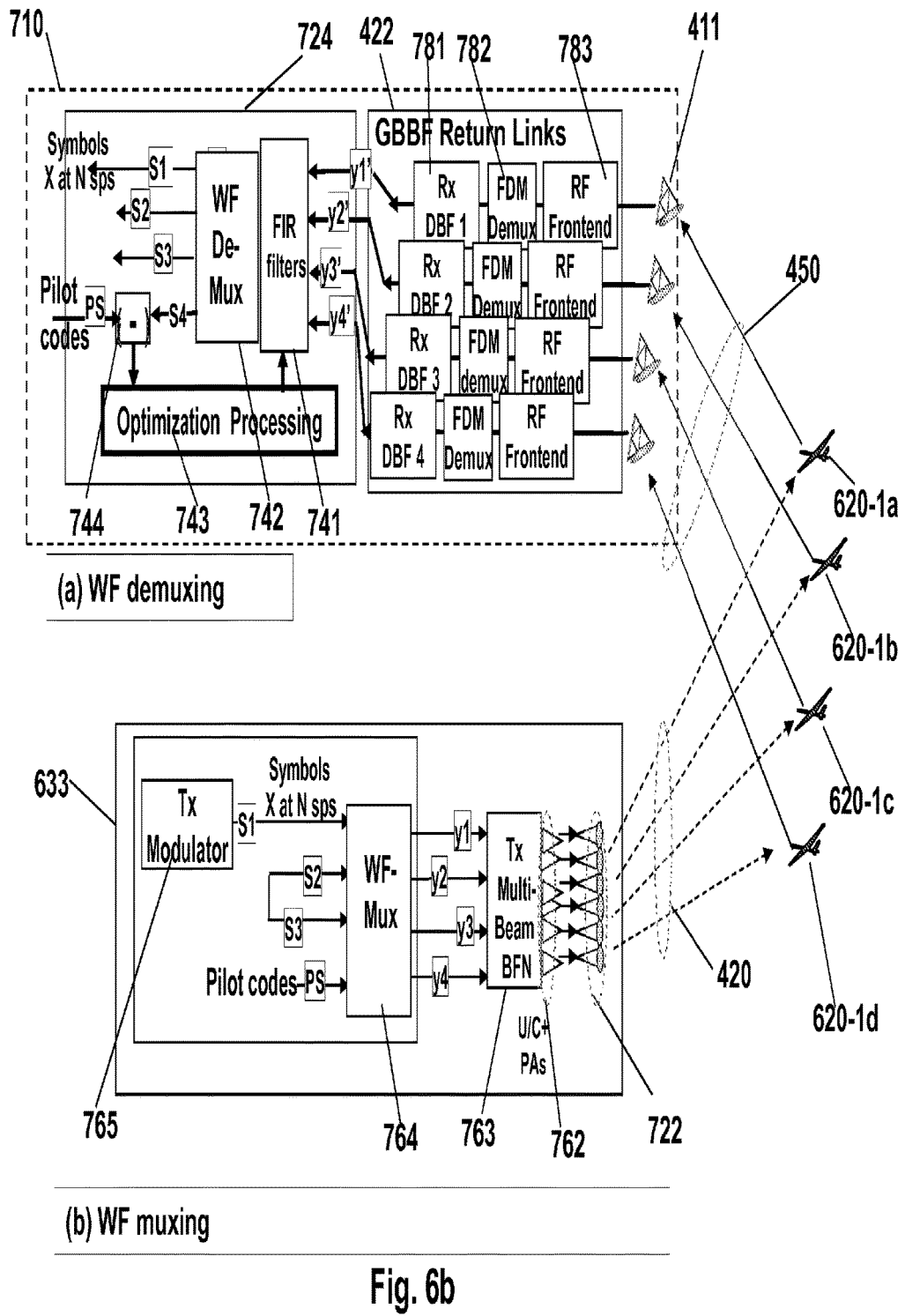
FIG. 6b depicts an exemplary multi-channel (e.g. four UAVs) return link transmission that includes a WF mux module, a GBBF processing, and a multi-beam transmit array located in a user terminal. It also depicts an exemplary ground hub facility with a multibeam receiving array pointing to four relaying UAVs, GBBF processing, and a WF demux with adaptive equalizers.

Turning now to an embodiment of a return link for the bent pipe communication configuration, FIG. 6b depicts an example of the operational principles of coherent power combining and WF MUX in the opposite direction. In the foreground area 130, a user has a terminal 633 that is equipped to transmit WF MUX signals via antennas 722. Terminal 633 comprises a TX modulator 765 that generates a stream of modulated signals, S1, and a stream of diagnostic codes, pilot codes PS. S1 and PS are sent as inputs to a 4-to-4 WFMux 764. Other inputs of WFMux 764 remain grounded or disconnected. Alternatively, if there are other nearby users in the same spot beam region 1302 wishing to send communications or data, they may also provide inputs S2 and S3 to a similar WFMux 763 in their own transmitting equipment. The S2 and S3 signals may also be modulated by similar modulators 765 in their own terminal equipment.

Each signal stream S1, S2, S3, PS is part of and maps to a unique WF vector at the output of the WFMux 764. The wavefront (WF) vectors in the four outputs of the WFMux 764, y1, y2, y3, y4 are mutually orthogonal to one another by construction if they were generated by a WFMux 764. Each user signals stream is associated with one WF vector; S1 with WF1, S2 with WF2, S3 with WF3, and PS with WF4. Orthogonal signals simplify reconstruction and there is less or no cross talk and leakage of one signal to another. The four parallel outputs y1, y2, y3, and y4 are sent to a transmitting multi-beam beam forming network BFN 763 that forms multiple tracking beams, following the movement of the relay air vehicles or UAVs 620-1. The outputs y1, y2, y3, and y4 of BFN 763 are conditioned, frequency up-converted and power amplified before being radiated by antenna array elements 722. Each of the four transmitted beam signals is sent to one UAV 620-1; for example, y1 is transmitted to UAV 620-1a, y2 to UAV620-1b, y3 to UAV620-1c, and y4 to UAV620-1d. As a result, the S1 signal stream is actually propagating in the four UAV paths in parallel, concurrently with a unique distribution pattern. For instance, S1 is duplicated and weighted by WF vector 1 or WF1 in the four parallel paths. So are the S2, S3 and PS signal streams weighted by different distribution patterns. For terminals 633, the signals S1, S2, S3, PS are transmitted in the L/S-band, but the techniques also work for signals of the C band or some other frequency band.

The foreground area 130 signals are detected and amplified by a receiving (Rx) antenna array (e.g. 124 in FIG. 2) with N elements on each of the four UAVs 620-1. On each UAV 620-1, the received signals are properly conditioned (low-noise amplified and filtered) individually, then FDM multiplexed, amplified, and frequency converted to the Ku/Ka or some other frequency band for relaying back to ground facility via background links (or feeder-links). Each of the four UAVs 620-1 then transmits the signals through one of the background links 450 to one of the four directional antennas 411, as depicted in FIG. 6b. The signals from each UAV 620-1 are transmitted to a particular antenna 411. Each antenna 411 inputs to one channel of the GBBF 422, where the GBBF 422 conditions the signals (e.g. amplifier, filter), down converts (783) the frequency of the signals, and FDM demultiplexer (782) the signals, before sending each one of the signals to a corresponding one multi-beam receiving DBF 781. The outputs y1', y2', y3', and y4' from each of the four DBFs 781 are input to an optimizer 724. In one embodiment, the optimizer 724 in the return link is similar to the optimizer 724 in the forward link, which was described earlier with respect to FIG. 6a. The return link optimizer 724 recovers the signals S1 and PS (and S2 and S3 if there were such signals sent from the terminal 633) in a manner similar to that in the forward link. However, the return link optimizer 724 is located in the ground hub 710 instead of being in a terminal 633. Moreover, the recovered S1 (and any S2, S3) signals are in a common frequency slot in the ground hub 710, and may be in a different frequency band than those of the slices S1, S2, S3 in the terminal 633, but the symbols or message is substantially the same except for any small error compensation differences. But in this embodiment, both the WF multiplexing and the WF demultiplexing are both performed on the ground, albeit in different ground areas.

In another embodiment, the four individual antennas 411 may be replaced by one multi-beam antenna with four beam receivers independently tracking different UAVs 620-1 concurrently. But regardless of the antenna configuration, the return link optimizer 724 comprises an adaptive equalizing FIR filter 741. Individual adaptive filters 741 compensate for amplitude and phase differentials caused by differences among the different propagation paths. Differences among the four FIR filters 741 are compensated for as a group to correct for time and phase differences. The coefficients of the return link FIR 741 are again optimized by an iterative control loop through the use of the diagnostic, known pilot signal PS. The outputs of the return link FIR 741 go to the WFdemux 742 that recovers the slices S1, S2, S3 by performing the inverse of the equations 1.1 through 1.4 (or performing calculations of 1.5a to 1.8a) to extract s1($t$), s2($t$), s3($t$) and s4($t$) at time index t. In the calculations, the weights w'11, w'12, etc., are initially, the best guess values that are obtained from the optimization process in the return link optimizer 724 (having the iterative control loop to obtain the best coefficients for the FIR filter 741). Thus, this return link is an example of using coherent power combining from radiations transmitted by relay air vehicles that are flying at a large distance apart. The power radiated by the UAVs 620-1 is coherently combined (added together through the WFdemux 742 with adaptive equalizers 741), after the adaptive equalization loop converges. Otherwise, the output signal at the first output port (slice1) of the WFdemux 742 will produce a S1 signal at lower intensity (e.g. 6 dB less for a 4-to-4 WF demux) with signal leakages coming from S2, S3, and PS in addition to any electronic receiver noises. The combining process is performed in 724 that comprises a baseband processor 724, rather than in free space as is the case with spatial power combining process.

Finally, the orientation and directions stated and illustrated in this disclosure should not be taken as limiting. For example, the directions, e.g. "top," are merely illustrative and do not orient the embodiments absolutely. That is, a structure formed on its "side" or "bottom" is merely an arbitrary orientation in space that has no absolute direction. Also, in actual usage, for example, the equipment may well be on its "side" because the airborne vehicles fly, bank and rotate in many directions; and then, "top" is pointing to the "side." Thus, the stated directions in this application are arbitrary designations.

While certain features of the implementations have been illustrated and described herein, modifications, substitutions, changes and equivalents will occur to those skilled in the art. It is, therefore, to be understood that the claims are intended to cover all such modifications and changes that fall within the scope of the embodiments. It should be understood that they have been presented by way of example only, not limitation, and various changes in form and details may be made. Any portion of the apparatus and/or methods described herein may be re-partitioned or formed in any combination, except mutually exclusive combinations. The embodiments described herein can include various combinations and/or sub-combinations of the functions, components and/or features of the different embodiments described. For example, the number of airborne vehicles stated can be increased or decreased because it is also possible to divide the equipment among more or fewer aircrafts. As another example, the communication frequencies may be changed to some other operational frequency, or the number of antennas increased, and so on. Finally, although the disclosure focuses on aircrafts, the methods described also work for water or land vehicles if there is unobstructed communication or if a vehicle can be moved to a hilltop, for example.

What is claimed is:

1. A retro-directive antenna system on a mobile airborne platform for communication with a ground hub located within a coverage area, the retro-directive antenna system comprising:
   an antenna array comprising a plurality of antenna elements;
   a receive beamforming network coupled to the antenna array, for generating concurrently a plurality of receive beams for the respective antenna elements, the receive beams corresponding to respective beam positions within the coverage area, a first beam position of the beam positions pointing to the ground hub and a corresponding receive beam receiving a target signal from the ground hub; and
   a diagnostic processor coupled to the receive beamforming network for determining a best position for the first beam position based on a ranking system and for controlling the receive beamforming network by updating the beam positions based on the best position for the first beam position,
   wherein the ranking system is based on a rank-index of a likelihood of an arrival of the target signal from different possible beam positions within a time frame of a diagnostic cycle, wherein each of the different possible beam positions is associated with a sum of rank-indices and wherein the best position for the first beam position is determined by being associated with a highest sum of rank-indices.

2. The retro-directive antenna system of claim 1, wherein the diagnostic processor comprises:
   a retro-directive analysis block for determining the best position for the first beam position using the ranking system that ranks the beam positions based on measured signal strengths of the target signal as received by the receive beams; and
   a beam controller coupled to the retro-directive analysis block for instructing the receive beamforming network to update the beam positions based on the best position for the first beam position.

3. The retro-directive antenna system of claim 1 further comprising:
   a transmit beamforming network coupled to the antenna array and the diagnostic processor, for generating concurrently a plurality of transmit beams for the respective antenna elements, the transmit beams pointing to respective beam positions within the coverage area.

4. The retro-directive antenna system of claim 3, wherein the transmit beamforming network comprises:
   a transmit switch matrix coupled to the diagnostic processor, for receiving instructions regarding the beam positions from the diagnostic processor and for receiving a transmit signal; and
   a Butler matrix coupled to the transmit switch matrix and the antenna array, for generating concurrently the transmit beams for the respective antenna elements, the transmit beams pointing to the respective beam positions and transmitting the transmit signal.

5. The retro-directive antenna system of claim 1, wherein the antenna array comprises at least one of a planar array and a conformal array.

6. The retro-directive antenna system of claim 1, wherein the retro-directive antenna system transmits and receives in Ku band or Ka band.

7. The retro-directive antenna system of claim 1, wherein the receive beamforming network comprises:
 a Butler matrix coupled to the antenna array, for generating concurrently the receive beams for the respective antenna elements and for receiving signals received by the receive beams;
 a first switch matrix coupled to the Butler matrix, for providing the target signal to a main signal path for further processing; and
 a second switch matrix coupled to the Butler matrix, for dynamically switching among the beam positions, generating diagnostic signals from the signals received by the receive beams and outputting the diagnostic signals to the diagnostic processor.

8. The retro-directive antenna system of claim 7, wherein the diagnostic processor samples the diagnostic signals to detect signal signatures and compares the detected signal signatures with known a priori signal signatures of the target signal.

9. The retro-directive antenna system of claim 1, wherein the ranking system estimates an angle of arrival of the target signal by identifying a signal associated with one of the receive beams that has a strongest signal intensity with signal signatures similar to known a priori signal signatures of the target signal.

10. The retro-directive antenna system of claim 1, wherein the ranking system estimates a time of arrival of the target signal by identifying a signal associated with one of the receive beams that has a strongest signal intensity with signal signatures similar to known a priori signal signatures of the target signal.

11. A method for communication between a mobile airborne platform and a ground hub located within a coverage area, the method comprising:
 providing an antenna array comprising a plurality of antenna elements onboard the mobile airborne platform;
 providing a receive beamforming network coupled to the antenna array;
 generating concurrently a plurality of receive beams for the respective antenna elements via the receive beamforming network, the receive beams corresponding to respective beam positions within the coverage area, a first beam position of the beam positions pointing to the ground hub and a corresponding receive beam receiving a target signal from the ground hub;
 providing a diagnostic processor coupled to the receive beamforming network;
 determining a best position for the first beam position based on a ranking system, via the diagnostic processor, wherein the ranking system is based on a rank-index of a likelihood of an arrival of the target signal from different possible beam positions within a time frame of a diagnostic cycle, wherein each of the different possible beam positions is associated with a sum of rank-indices and wherein the best position for the first beam position is determined by being associated with a highest sum of rank-indices; and
 controlling the receive beamforming network by updating the beam positions based on the best position for the first beam position, via the diagnostic processor.

12. The method of claim 11, wherein the determining the best position for the first beam position comprises:
 determining, via a retro-directive analysis block included in the diagnostic processor, the best position for the first beam position using the ranking system that ranks the beam positions based on measured signal strengths of the target signal as received by the receive beams;
and wherein the controlling the receive beamforming network comprises:
 updating the beam positions based on the best position for the first beam position, via a beam controller included in the diagnostic processor.

13. The method of claim 11 further comprising:
 providing a transmit beamforming network coupled to the antenna array and the diagnostic processor; and
 generating concurrently a plurality of transmit beams for the respective antenna elements via the transmit beamforming network, the transmit beams pointing to respective beam positions within the coverage area.

14. The method of claim 13, wherein the providing a transmit beamforming network comprises:
 providing a transmit switch matrix coupled to the diagnostic processor; and
 providing a Butler matrix coupled to the transmit switch matrix and the antenna array;
and wherein the generating concurrently a plurality of transmit beams comprises:
 receiving instructions regarding the beam positions from the diagnostic processor and receiving a transmit signal, via the transmit switch matrix; and
 generating concurrently the transmit beams for the respective antenna elements via the Butler matrix, the transmit beams pointing to the respective beam positions and transmitting the transmit signal.

15. The method of claim 11, wherein providing the antenna array comprises providing at least one of a planar array and a conformal array.

16. The method of claim 11, wherein the providing the receive beamforming network comprises:
 providing a Butler matrix coupled to the antenna array;
 generating concurrently the receive beams for the respective antenna elements, via the Butler matrix;
 receiving signals received by the receive beams, via the Butler matrix;
 providing a first switch matrix coupled to the Butler matrix;
 providing the target signal to a main signal path for further processing, via the first switch matrix; and
 providing a second switch matrix coupled to the Butler matrix;
 dynamically switching among the beam positions, via the second switch matrix;
 generating diagnostic signals from the signals received by the receive beams, via the second switch matrix; and
 outputting the diagnostic signals to the diagnostic processor, via the second switch matrix.

17. The method of claim 16, wherein the determining the best position for the first beam position comprises:
 sampling the diagnostic signals to detect signal signatures; and
 comparing the detected signal signatures with known a priori signal signatures of the target signal.

18. The method of claim 11, wherein the determining the best position for the first beam position based on a ranking system comprises:
 estimating an angle of arrival of the target signal by identifying a signal associated with one of the receive beams that has a strongest signal intensity with signal signatures similar to known a priori signal signatures of the target signal.

19. A retro-directive antenna system on a mobile airborne platform for communication with first and second ground hubs located within a coverage area, the retro-directive antenna system comprising:
an antenna array comprising a plurality of antenna elements;
a receive beamforming network coupled to the antenna array, for generating concurrently a plurality of receive beams for the respective antenna elements, the receive beams corresponding to respective beam positions within the coverage area, a first beam position of the beam positions pointing to the first ground hub and a corresponding first receive beam receiving a first target signal from the first ground hub, a second beam position of the beam positions pointing to the second ground hub and a corresponding second receive beam receiving a second target signal from the second ground hub; and
a diagnostic processor coupled to the receive beamforming network for determining concurrently a first best position for the first beam position and a second best position for the second beam position using a ranking system that ranks the beam positions based on measured signal strengths of the first and second target signals as received by the receive beams, and for controlling the receive beamforming network by updating the beam positions based on the first best position for the first beam position and the second best position for the second beam position, wherein the ranking system is based on a rank-index of a likelihood of an arrival of the target signal from different possible beam positions within a time frame of a diagnostic cycle, wherein each of the different possible beam positions is associated with a sum of rank-indices and wherein the best position for the first beam position is determined by being associated with a highest sum of rank-indices.

20. The retro-directive antenna system of claim 19 further comprising:
a transmit beamforming network coupled to the antenna array and the diagnostic processor, for generating concurrently a plurality of transmit beams for the respective antenna elements, the transmit beams pointing to respective beam positions within the coverage area.

* * * * *